Feb. 21, 1933.  B. VAN KIRK  1,898,913
BAKE PAN
Filed Dec. 2, 1931
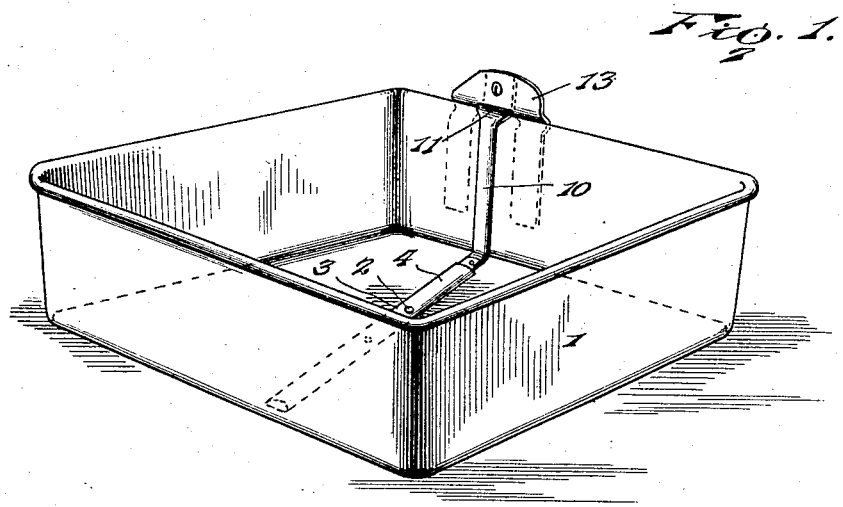
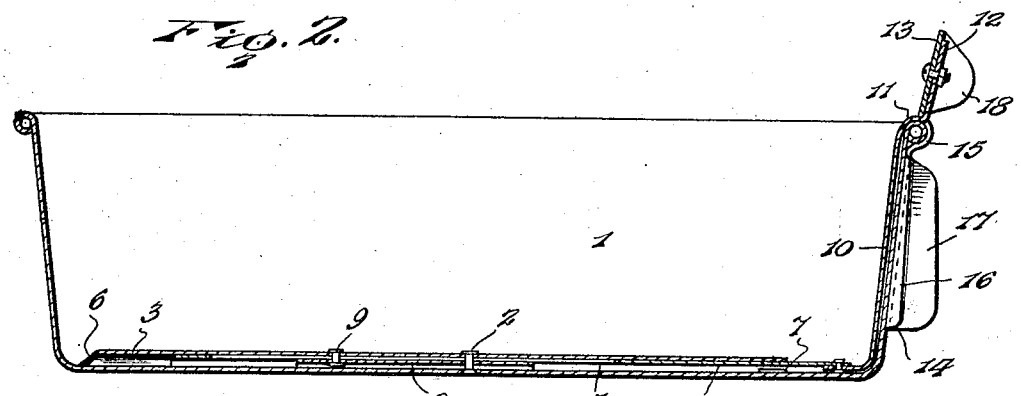
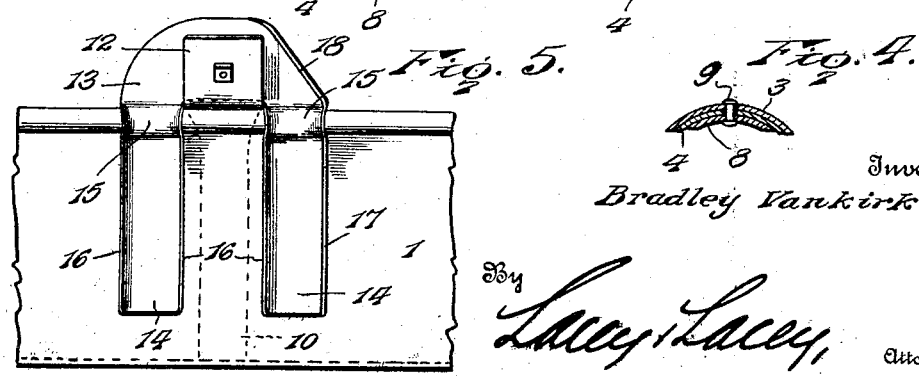
Inventor
Bradley Vankirk.
By Lacey & Lacey,
Attorneys Patented Feb. 21, 1933

1,898,913

UNITED STATES PATENT OFFICE

BRADLEY VAN KIRK, OF LOUISVILLE, OHIO, ASSIGNOR OF ONE-HALF TO GEORGE KELL, OF LOUISVILLE, OHIO

BAKE PAN

Application filed December 2, 1931. Serial No. 578,549.

It is customary, in baking, to apply grease or oil to the inner surface of a bake pan in order that the crust which forms upon the bottom and sides of the cake or bread will not adhere to the pan. It sometimes happens, however, that the oil or grease does not fully serve its purpose and, even when it does, it is objectionable because sometimes it imparts an unpleasant flavor and taste to the commodity. It is also objectionable as being apt to soil the garments of the cook and for various other reasons. The object of the present invention is to provide simple means which will enable a cook to separate the cooked dough from the bottom and sides of the pan under all conditions which means may be permanently mounted upon the pan and may be easily manipulated without materially decreasing the capacity of the pan or altering the shape of the loaf produced therein. A particular object of the invention is to provide a device for the stated purpose which will be applicable to pans having a form other than circular and which will readily turn the corners of the pan. The stated objects, and other objects which will incidentally appear in the course of the following description, are attained in such an apparatus as is illustrated in the accompanying drawing and the invention resides in certain novel features which wil be particularly defined in the appended claims.

In the drawing,

Figure 1 is a perspective view of a bake pan having my improved device applied thereto, Fig. 2 is an enlarged diametrical section through the same, Fig. 3 is a bottom plan view of the cutter removed from the pan, Fig. 4 is a detail section on the line 4—4 of Fig. 3, on a larger scale, Fig. 5 is a side elevation of a portion of a pan showing the handle or slide of the cutter.

The bake pan 1 illustrated in the accompanying drawing is square or rectangular but may be of any preferred form. The pan is of the usual construction but is provided with a small opening through its bottom, at its center, to receive a pivot 2 which will secure the cutter of the present invention upon the pan in operative position. The cutter comprises an upper blade 3 and a lower blade 4 which are of arched cross section and formed on concentric arcs, the edges of the cutters being beveled, as shown most clearly in Fig. 4, whereby they may rest directly upon the surface of the bottom of the pan and move over the same so as to separate the crust therefrom. It will be understood that the cutters are formed on large radii so that their curvatures will be relatively slight and they will lie close to the bottom of the pan so that the possible groove which may be formed in the crust will be very shallow and will not detract from the appearance of the baked loaf. The pivot 2 may be a bolt or rivet passing through the two cutters and the lower cutter 4 is provided with a central longitudinal slot 5 engaging the pivot so that, while the blade will be held in engagement with the pivot and alined with the upper cutter, it may slide upon the pivot so that, as the cutters are moved over the bottom of the pan, the end of the under cutter may be kept close to the side of the pan. It will be understood that the upper cutter has a fixed length and one end thereof may reach to a side of the pan when the cutter is disposed upon a diameter thereof, but, when the cutter is turned pivotally, the end of this upper cutter will not reach to the corner of the pan owing to the greater length of the diagonal. As shown most clearly in Fig. 2, the free end of the upper cutter 3 is closed, as shown at 6, so that the dough or batter cannot flow into the space below the cutter and thereby clog the action of the same. The opposite end of the cutter, however, is open so that the lower cutter may extend therethrough and, at the open end of the upper cutter, are formed inturned lips 7, at its edges, which extend under the lower cutter and thereby aid in retaining the cutters in the proper relation. These lips also constitute shoes or runners whereby the open end of the upper cutter may move over the bottom of the pan without tending to dig into the same. Below the under cutter 4, there is provided a supporting strip 8 which has one end fitted about the pivot 2 and its opposite end connected with the upper cutter 3 by a rivet or pin 9 inserted through the supporting strip, near the end thereof, and also passing through the upper cutter and through the slot 5 of the lower cutter, the upper cutter being thereby so connected with the lower cutter and the supporting strip that it will be caused to turn with the lower cutter while permitting free endwise movement of the lower cutter. The projecting end of the lower cutter is pivoted to a side cutter 10 which may be of arcuate cross section and conforms closely to the side wall of the pan, as shown in Figs. 1 and 2, so that, when moved along the wall, it will pass between the same and the side crust of the loaf so as to separate the crust from the wall. This side cutter has its upper end portion bent so as to rest upon the upper edge of the side wall of the pan, as shown at 11, and is then turned upwardly, as at 12, to be attached to a handle 13 which is slidably engaged with the wall of the pan. This handle member is a sheet metal plate having an upper portion riveted or otherwise secured to the projecting end 12 of the side cutter and extending to the opposite sides thereof, the lower portion of the plate being bifurcated to provide depending arms 14 which bear against the outer surface of the side of the pan and have arcuate necks 15 connecting them with the head 13 and closely fitting to the bead at the upper edge of the pan, as shown clearly in Fig. 2. This arrangement mounts the handle slidably upon the pan but locks it thereon so that it cannot be accidentally separated therefrom although it may slide easily along the same under slight pressure. The side edges of the arms 14 are turned outwardly, as indicated at 16, so that they may move readily over the surface of the pan without marring the same or digging thereinto, and one side edge has a relatively wide flange 17 formed thereat against which pressure may be applied to move the handle along the pan in either direction. For the same purpose, one corner of the head 13 is bent outwardly to form a flange or thumb piece 18.

From the foregoing description, taken in connection with the accompanying drawing, it will be seen that I have provided an exceedingly simple device which may be readily applied to any pan and which will operate efficiently to loosen crust from the pan when a loaf is to be removed therefrom. The dough or batter is placed in the pan in the usual manner, over the cutters, and the baking operation is performed as heretofore. When the baking is complete, the handle is slid along the pan so as to be moved around the entire circumference of the same and the side cutter 10 will follow the movements of the handle so as to positively loosen the side crusts of the loaf from the pan. At the same time, the cutters 3 and 4 will be moved over the bottom of the pan so that the bottom of the loaf will be removed from the bottom of the pan wherever there has been any tendency to adhere to the same. As the side cutter moves from the center of a side of the pan toward a corner thereof, the distance between the cutter and the center of the bottom of the pan will, of course, be increased and this condition will cause the lower cutter 4 to move outwardly endwise from under the upper cutter so that the combined length of the two cutters will reach to every point of the area of the bottom of the pan and, consequently, act upon the entire bottom surface of the loaf. The width of the side cutter is such that it may readily turn the inside corners of the pan, and the bifurcated construction of the slide or handle permits it to readily turn the outer corners without binding thereon and without being forced out of engagement with the pan. The device is exceedingly compact and simple in the construction of its parts and may be applied to any pan at a very slight cost. It is easily manipulated and efficient in operation.

Having thus described the invention, I claim,

1. The combination with a bake pan, of a cutter pivotally mounted upon the bottom of the pan at the center of the same, and consisting of upper and lower members, the lower member being slidable endwise on the pivot, a side cutter pivotally connected to a projecting end of the lower cutter member and conforming to the side wall of the pan, and a handle secured to the upper end of the side cutter and slidably engaged with the side of the pan and having a portion formed to lock the handle to the pan.

2. The combination with a bake pan, of an extensible cutter pivotally mounted upon the bottom of the pan at the center of the same, a side cutter conforming to the side of the pan and pivoted at its lower end to a projecting end of the extensible cutter, the upper end of the side cutter being extended upwardly from the same, and a bifurcated handle secured to the projecting upper end of the side cutter and having its arms at the opposite sides of the cutter and depending below the upper edge of the pan and fitting closely thereto and provided with intermediate arcuate portions conforming to the cross sectional contour of the edge of the pan and locking the handle and cutter thereto.

3. The combination with a bake pan, of an extensible cutter pivoted upon the bottom of the pan at the center of the same and consisting of upper and lower members, the lower member being slidable endwise across the pivot, a side cutter pivoted at its lower end to a projecting end of the lower cutter member and conforming to the side of the pan and having its upper end projecting above the pan, and a bifurcated handle member secured across the upper projecting end of the side cutter and having depending arms fitting closely against the outer side of the pan and intermediate necks fitting closely to and about the edge of the pan to lock the handle thereto, the side edges of the arms being turned outwardly and one edge of one arm having an extended flange to receive a moving force.

4. The combination with a bake pan, of an extensible cutter pivoted upon the bottom of the pan at the center of the same, a side cutter pivoted at its lower end to a projecting end of the telescopic cutter and conforming to the side of the pan and having its upper end projecting above the pan, and a bifurcated handle member secured to the upper projecting end of the side cutter and having depending arms fitting closely against the outer side of the pan and intermediate necks fitting closely to and around the edge of the pan to lock the handle thereto, the side edges of the arms being turned outwardly and one edge of one arm having an extended flange to receive a moving force and the upper end of the handle being provided with a laterally projecting thumb piece.

5. The combination with a bake pan, of a cutter consisting of upper and lower members pivoted upon the bottom of the pan at the center of the same, one of said members being mounted to move endwise upon the pivot, a side cutter pivoted at its lower end to the end of said endwise movable cutter and conforming closely to the side of the pan, and a supporting member disposed below the lower cutter member and held at one end by the pivot of the cutter and connected at its opposite end with one of the cutter members and slidably engaged with the other cutter member.

6. The combination with a bake pan, of a cutter pivoted upon the bottom of the same at the center thereof and comprising upper and lower arcuate cutter members, the upper member having one end closed and the lower member being provided with a longitudinal slot engaging the pivot of the members and having one end projecting beyond the open end of the upper cutter member, and means connected with the end of the lower cutter member for moving the same over the bottom of the pan.

7. The combination with a bake pan, of a cutter pivoted upon the bottom of the pan at the center of the same and comprising upper and lower arcuate cutter members, the upper member having one end closed and its opposite end open and the lower cutter member being slidably engaged with the pivot for the cutter, means connected with the projecting end of the lower cutter member for moving the cutter over the bottom of the pan, and retaining lips at the open end of the upper cutter member engaging under the edges of the lower cutter member.

In testimony whereof I affix my signature.
BRADLEY VAN KIRK.